United States Patent [19]
Inaji et al.

[11] Patent Number: 4,695,907
[45] Date of Patent: Sep. 22, 1987

[54] ROTARY HEAD DEFLECTION APPARATUS

[75] Inventors: Toshio Inaji, Mino; Hiroshi Okamoto, Nara; Nobuyoshi Yokobori, Osaka, all of Japan

[73] Assignee: Matsushita Electric Industrial Co., Ltd., Osaka, Japan

[21] Appl. No.: 671,583

[22] Filed: Nov. 15, 1984

[30] Foreign Application Priority Data

Nov. 15, 1983 [JP] Japan ................................. 58-215488
Nov. 21, 1983 [JP] Japan ................................. 58-218911
Nov. 29, 1983 [JP] Japan ................................. 58-224716

[51] Int. Cl.$^4$ ...................... G11B 5/588; G11B 21/04
[52] U.S. Cl. ................................... 360/107; 360/10.2; 360/77; 360/84; 360/130.24
[58] Field of Search .................. 360/10.2, 75, 77, 84, 360/85, 104, 107, 109, 130.23, 130.24

[56] References Cited

U.S. PATENT DOCUMENTS

| | | | |
|---|---|---|---|
| 4,314,284 | 2/1982 | Sato et al. | 360/10.2 |
| 4,337,492 | 6/1982 | Brookhart et al. | 360/109 |
| 4,363,046 | 12/1982 | Saito | 360/77 X |
| 4,365,279 | 12/1982 | Kinjo | 360/109 |
| 4,446,497 | 5/1984 | Hirayama | 360/109 |
| 4,564,876 | 1/1986 | Takahashi et al. | 360/107 |

FOREIGN PATENT DOCUMENTS

| | | | |
|---|---|---|---|
| 54-138413 | 10/1979 | Japan | 360/77 |
| 57-98130 | 6/1982 | Japan | 360/109 |

Primary Examiner—Stuart N. Hecker
Assistant Examiner—Benjamin E. Urcia
Attorney, Agent, or Firm—Wenderoth, Lind & Ponack

[57] ABSTRACT

A rotary head deflection apparatus for allowing magnetic heads to properly scan signal tracks recorded on a magnetic tape, and used for a helical scan system video tape recorder, which is constituted of driving coils wound onto a stator and movable members carrying magnetic heads and magnets, so that the driving coils are energized to enable the magnetic heads to be displaced in the direction of the axis of rotation of the rotary member.

6 Claims, 9 Drawing Figures

ROTARY HEAD DEFLECTION APPARATUS

BACKGROUND OF THE INVENTION

1. Field of the Invention

This invention relates to a rotary head assembly which is adapted to displace or deflect rotary magnetic heads in directions parallel to a rotary axis to properly scan signal tracks recorded on a magnetic tape and is effectively usable for a helical scan rotary head type video tape recorder.

2. Description of the Prior Art

Recently, in order to achieve high density recording and reproduction by means of a video tape recorder using magnetic tape as a recording medium, an attempt has been made to carry out tracking control with respect to the rotary magnetic heads. In a case where the magnetic heads are displaced and driven under control of the tracking control to properly scan the recording tracks on the magnetic tape the reproduced images are free from noise bars and the like in all reproduction modes fast motion, still or slow motion reproduction mode.

Conventionally, the system of displacing the rotary magnetic heads as described above is that the magnetic heads are each mounted on a bimorph type piezoelectric element to thereby utilize the electric-to-mechanical conversion characteristic thereof to displace the magnetic heads. A bimorph type piezoelectric element has hysteresis due to the property of the material but is weak with respect to the mechanical strength. Thus, the element, when displaced in a greater amplitude, is in danger of being broken. Moreover, the characteristic changes with time. Accordingly, it is difficult to construct a deflectable rotary head assembly of adequate durability and stability. Furthermore, since this system should drive the piezoelectric element by electric signals including positional change information which are transmitted from a stationary unit to the rotary unit means of electrically conductive slip rings and brushes, there is a problem that the system becomes complicated in construction. Also, since usually a high voltage of several hundreds volts is required to displace the piezoelectric element a desired pitch, an expensive high voltage generating circuit is required.

The conventional deflectable rotary head assembly, when displaced with a large amplitude, cannot hold the magnetic heads in position perpendicular to the surface of the magnetic tape, resulting in so-called flapping. As a result, the reproduced signal levels attenuate which leads to deterioration of picture quality.

Other than the above described rotary head assembly for displacing the rotary magnetic heads, another type using electromagnetic force has been proposed. This kind of electromagnetic deflectable rotary head assembly has adequate durability and stability in operation in comparison with the assembly utilizing the electric-to-mechanical conversion characteristic of the piezoelectric element. However, the conventional electromagnetic type apparatus has not been been practical because power which is necessary to displace the magnetic heads in a required amplitude in a direction parallel to the axis of rotation becomes quite large.

SUMMARY OF THE INVENTION

An object of the invention is to provide a deflectable rotary head assembly which is adapted to vertically displace rotary magnetic heads so as to enable proper scanning on signal tracks recorded on a magnetic tape and which has simple construction and is usable for a helical scan video tape recorder.

This deflectable rotary head assembly controls control currents flowing in first and second driving coils disposed at a stationary member having a cylindrical surface with the center axis thereof coinciding with the axis of rotation of a rotary member to thereby utilize an electromagnetic force to enable reliable displacement of magnetic heads mounted on movable members in directions parallel to the axis of rotation of the rotary member.

Furthermore, the natural frequency of the whole mass of movable members to which the magnetic heads are fixed and the spring constant of an elastic support member for supporting the movable members is set in the vicinity of the basic frequency component of the rotating trace of each magnetic head, thereby enabling the power necessary for displacing the magnetic heads to be reduced to a minimum. Especially, since an electromagnetic conversion system comprising magnets mounted on the movable members and driving coils disposed on the stationary member is used as a driving force applying means for the magnetic heads, no slip rings and brushes are required, thereby making the assembly more advantageous than the conventional assembly using slip rings and brushes. Specifically, no electric noise is generated; the rotation of each magnetic head is not subjected to an excessive load; a long life span is possible; and no special high voltage generating circuit is required.

Also, the deflectable rotary head assembly of the invention can independently control the amount of displacement of each of the magnetic heads in directions parallel to the axis of rotation, so that each magnetic head can be displaced independently of the other so as to form an optimum rotating trace with less vibration and less power consumption. In other words, a deflectable rotary head assembly of high efficiency can be achieved.

Furthermore, since the movable members carrying the magnetic heads are mounted on to the rotary member by two leaf springs fixed to the upper and lower end faces of the movable members, the magnetic heads are always displaced perpendicularly with respect to the surface of magnetic tape, whereby contact pressure of each magnetic head on the tape is kept constant to obtain stable reproduced signal levels.

Other objects and features of the invention will become apparent from the following description of a preferred embodiment with reference to the accompanying drawings.

DESCRIPTION OF THE PREFERRED EMBODIMENTS

Figure 1:
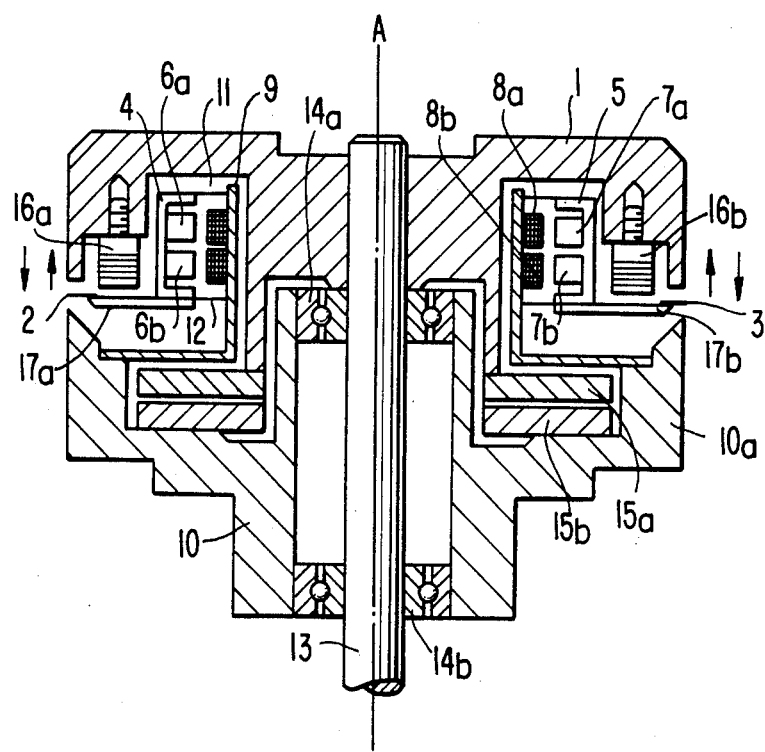
FIG. 1 is a sectional view of an embodiment of a deflectable rotary head assembly of the invention, housed in a rotary cylinder.
Figure 2:
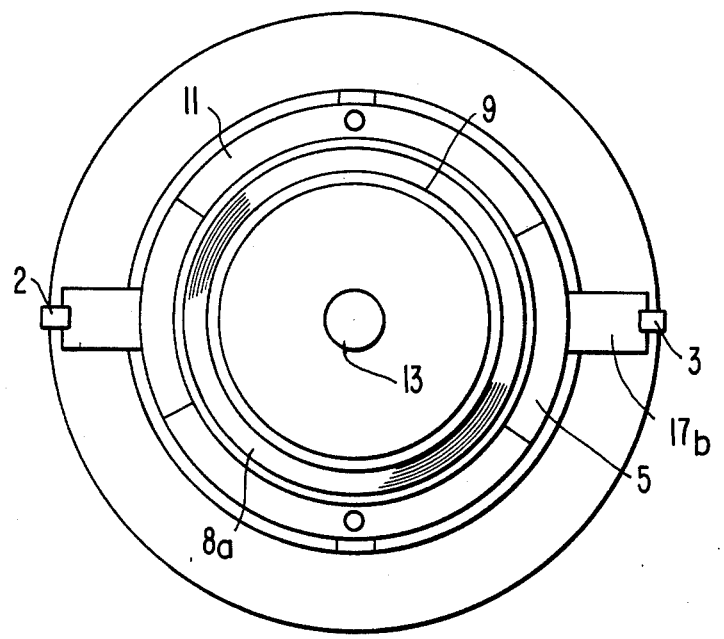
FIG. 2 is a top plan view of the FIG. 1 embodiment.

Referring to FIGS. 1 and 2, reference numeral 1 designates a conventional rotary drum, on the outer periphery of which a magnetic tape is wound, the rotary drum 1 being rotated by a motor (not shown) around the axis A of rotation, and 2 and 3 designate magnetic heads, which are mounted on movable members 4 and 5 displaceable in directions parallel to the axis of rotation, i.e., in the directions indicated by the dotted line and solid line arrows.

Reference numerals 6a, 6b, 7a and 7b designate magnets fixed to the movable members 4 and 5 and magnetized radiallly with respect to the axis A of rotation, and 10 designates a stationary portion of a rotary cylinder, which constitute in part a stationary drum 10a.

Reference numeral 9 designates a cylindrical stator, around which first and second driving coils 8a and 8b are wound, the stator 9 being fixed to the stationary portion 10 and positioned to be coaxial with the axis A of rotation, and 11 and 12 designate annular leaf springs used as elastic support members, the movable members 4 and 5 being supported on the rotary member 1 through the leaf springs 11 and 12 for being displaceable only in directions parallel to the axis of rotation of the rotary member 1.

The first and second magnets 6a, 7a, 6b and 7b mounted on the movable members 4 and 5 are opposed at the magnetized faces to the first and second driving coils 8a and 8b wound on the stator 9 and spaced at predetermined distances from the coils 8a and 8b respectively, Reference numeral 13 designates a rotary shaft supported by bearings 14a and 14b provided in a boss of stationary portion 10, 15a and 15b designate a rotor and a stator of a rotary transformer which properly transfer signals to the magnetic heads 2 and 3, and 16a and 16b designate head position detecting coils for detecting the amount of displacement of each magnetic head, the coil faces of coils 16a and 16b being opposed to conductive head base members 17a and 17b at predetermined distances therefrom respectively.

A high frequency current flows in the head position detection coils 16a and 16b to generate therearound alternating magnetic fields, and when the conductive head base members 17a and 17b approach the magnetic fields, an eddy current is generated at each base member, so that the impedance of the respective head position detecting coils 16a and 16b changes. The head position detecting coils 16a and 16b detect the positions of magnetic head 2 and 3 to thereby control the head deflection under proper damping. Connecting wires from the magnetic heads 2 and 3 to the rotor 15a of the rotary transformer, lead wires from the stator 15b to the same, and lead wires for feeding control currents to the driving coils 8a and 9b, are not shown.

Figure 3:
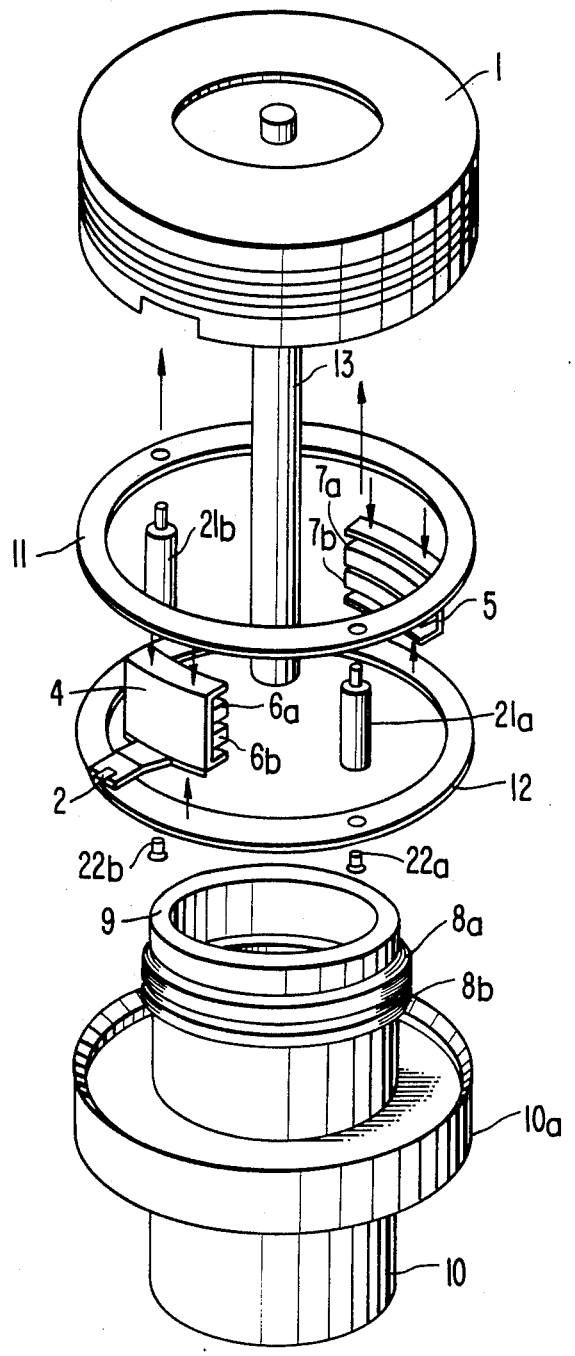
FIG. 3 is an exploded perspective view thereof.

Referring to FIG. 3, the components corresponding to those in FIGS. 1 and 3 are designated by the same reference numerals and a duplicate description is therefore omitted.

In FIG. 3, reference numerals 21a and 21b designate mounting spacers for mounting the leaf springs 11 and 12 on the rotary body 1, and 22a and 22b designate spring mounting screws for mounting the leaf spring 12 on the mounting spacers 21a and 21b.

The spring mounting spacers 21a and 21b and spring mounting screws 22a and 22b, mount the leaf springs 11 and 12 carrying the movable members 4 and 5, respectively, on the rotary member 1.

Figure 4:
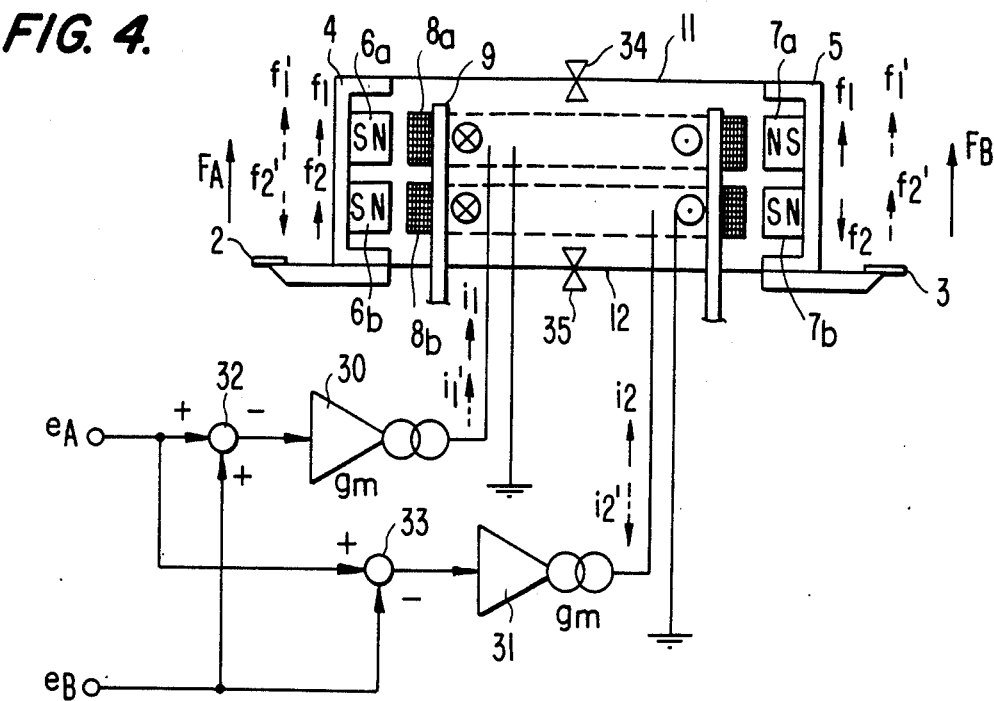
FIG. 4 is a diagram for illustrating the operation thereof.

Referring to FIG. 4, the operational principle of this embodiment is shown, in which the components corresponding to those in FIGS. 1, 2 and 3 are designated by the same reference numerals. In FIG. 4, reference numerals 30 and 31 designate drive circuits for feeding control currents to the first and second driving coils 8a and 8b respectively, 32 designates an adder, and 33 designates a subtracter, which are given input commands $e_A$ and $e_B$ respectively, and 34 and 35 designate the fixed points for mounting the leaf springs 11 and 12 on the rotary member 1.

Next, an explanation will be given of the operation of the embodiment with reference to FIG. 4.

In FIG. 4, the first magnet 6a and the second magnet 6b mounted on the movable member 4 both have N poles on the magnetized faces opposite to the first and second driving coils 8a and 8b, and the first magnet 7a and the second magnet 7b mounted on the movable member 5 have an N pole and an S pole at the magnetized faces opposite to the first and second driving coils 8a and 8b, respectively.

At first, in a case where control currents $i_1$ and $i_2$ flow in the driving coils 8a and 8b in the directions of the solid arrows in the drawing, the first magnet 6a and second magnet 6b fixed to the movable member 4 generate upwardly directed driving forces respectively, the driving forces being represented by $f_1$ and $f_2$, and the movable member 4 is subjected to the driving force $f_1 + f_2$ so as to move upwardly.

On the other hand, the first magnet 7a fixed to the movable member 5 is subjected to an upward driving force $f_1$ and the second magnet 7b to a downward driving force $f_2$, whereby the movable member 5 is subjected to a driving force $f_1 - f_2$. Assuming that the driving forces $f_1$ and $f_2$ generated in the members 4 and 5 are equal in magnitude to each other and $f_1 = f_2$ should hold, the movable member 4 is subjected to a driving force $2f_1$ and movable member 5 is subjected to no driving force. As a result, in a case where the control currents $i_1$ and $i_2$ flow in the first and second driving coils 8a and 8b in the direction of the solid arrows in FIG. 4 to thereby equalize the driving forces $f_1$ and $f_2$ acting on the first and second magnets 7a and 7b, only the movable member 4 moves upwardly, and movable member 5 is kept stationary.

Next, an explanation will be given of a case where the direction of the control current $i_1$ flowing in the first driving coil 8a is not changed, but the control current $i_2$ flowing in the second driving coil 8b only is reversed as shown by the dotted arrows in FIG. 4, thereby causing control currents $i_1'$ and $i_2'$ to flow in the first and second driving coils 8a and 8b. In this case, the first magnet 6a fixed to the movable member 4 is subjected to an upward driving force $f_1'$ and the second magnet 6b to a downward driving force $f_2'$, whereby the movable member 4 is subjected to a driving force $f_1' - f_2'$.

On the other hand, the first magnet 7a and second magnet 7b fixed to the movable member 5 generate upward driving forces $f_1'$ and $f_2'$ respectively, whereby the movable member 5 is subjected to an upward driving force $f_1' + f_2'$.

Now, if it is assumed that the generated driving forces $f_1'$ and $f_2'$ are equal in magnitude and the relational expression $f_1'=f_2'$ should hold, the movable member 4 is not subjected to a driving force and movable member 5 is subjected to the upward driving force $2f_1'$. As a result, in the case where the control currents $i_1'$ and $i_2'$ flow in the first and second driving coils 8a and 8b in the direction of the dotted arrows in FIG. 4, the movable member 4 is kept stationary, and only movable member 5 moves upwardly.

The first and second driving coils 8a and 8b are supplied with the control currents $i_1$ and $i_2$ from the drive circuits 30 and 31. The adder 32 and subtracter 33 displace the first and second movable members 4 and 5 corresponding to $e_A$ and $e_B$.

Next, an explanation will be given of the operations of the adder 32 and subtracter 33 with reference to FIG. 4.

When forces acting on the movable members 4 and 5 are represented by $F_A$ and $F_B$, the force $F_A$ on the movable member 4 is given by the following equation:

$$F_A = n \cdot i_1 \cdot B \cdot S + n \cdot i_2 \cdot B \cdot S \quad (1)$$
$$= n \cdot B \cdot S(i_1 + i_2),$$

where n is the number of turns per unit height of each of the first and second driving coils, B is the magnetic flux generated by the first magnets 6a and 7a and second magnets 6b and 7b across the magnets and stator 9, and S is the area of each of the first and second magnets opposite to the first and second driving coils respectively.

Similarly, the force $F_B$ acting on the second movable member 5 is given by the following equation:

$$F_B = n \cdot i_1 \cdot B \cdot S - n \cdot i_2 \cdot B \cdot S \quad (2)$$
$$= n \cdot B \cdot S(i_1 - i_2).$$

As seen from FIG. 4, the following relational equations between the displacement inputs $e_A$ and $e_B$, and the control currents $i_1$ and $i_2$ should hold:

$$i_1 = g_m (e_A + e_B) \quad (3), \text{ and}$$

$$i_2 = g_m (e_A - e_B) \quad (4),$$

where $g_m$ represents the mutual conductance of each of the drive circuits 30 and 31.

When the equations (1) and (2) are changed by use of equations (3) and (4), the following equations will be obtained:

$$F_A = n \cdot B \cdot S\{g_m(e_A + e_B) + g_m(e_A - e_B)\} \quad (5)$$
$$= 2 \cdot n \cdot B \cdot S \cdot g_m \cdot e_A$$

$$F_B = n \cdot B \cdot S\{g_m(e_A + e_B) - g_m(e_A - e_B)\} \quad (6)$$
$$= 2 \cdot n \cdot B \cdot S \cdot g_m \cdot e_B$$

As seen from the equations (5) and (6), the command input $e_A$ can independently control the driving force $F_A$ of fist movable member 4 and command input $e_B$ can similarly control the driving force $F_B$ of second movable member 5.

The principle portion of the magnetic head in the deflectable rotary head assembly of the invention will be described in connection with FIGS. 5a–5c, in which the components corresponding to those in FIGS. 1, 2 and 3 are designated by the same reference numerals. Reference numeral 40 designates a magnetic tape.

Figure 5A:
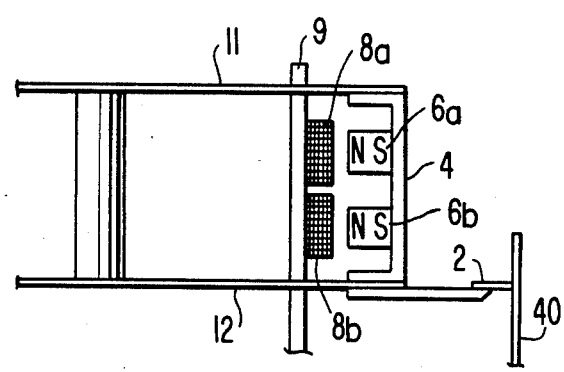
FIG. 5a–5c are sectional views of the principal portion for explaining displacement of magnetic heads of the deflectable rotary head assembly of the invention.

FIG. 5a shows the first and second driving coils 8a and 8b when no control current is supplied and in which the gap containing surface of magnetic head 2 contacts the surface of magnetic tape with the axis of the head perpendicular to the tape.

Figure 5B:
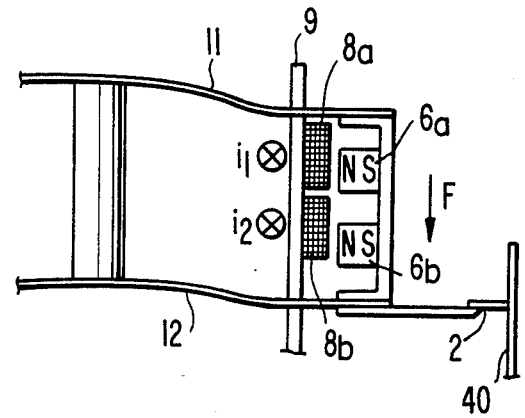
Figure 5C:
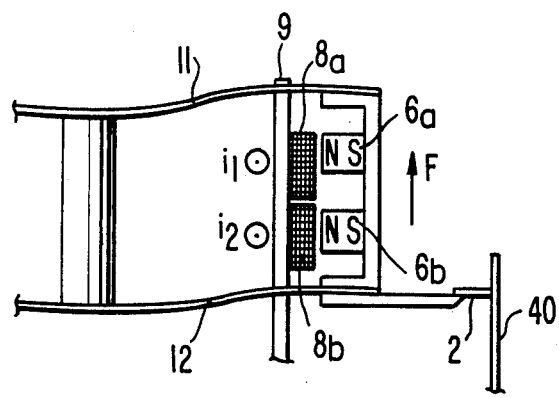

FIGS. 5b and 5c show the displacements of the magnetic head 2 when the control currents $i_1$ and $i_2$ flow in the first and second driving coils 8a and 8b in the directions of the arrows F respectively.

In FIG. 5b, the first and second magnets 6a and 6b are subjected to both the downward driving forces. Hence, the composite driving force F acts downwardly to displace the movable member 4 carrying the magnetic head 2 until the movable member 4 balances the restoring forces of leaf springs 11 and 12 constituting the elastic support member.

Similarly, in FIG. 5c, the driving forces acting on the first and second magnets 6a and 6b both act upwardly on the magnetic heads 2 so that the magnetic head 2 is displaced upwardly. As seen from FIGS. 5b and 5c, since the magnetic head 2 is displaced while being kept perpendicular to the surface of magnetic tape 40, the gap surface of magnetic tape 2 is always in proper contact with the surface of magnetic tape 2, thereby making the contact pressure always constant.

As a result, in the deflectable rotary head assembly of the invention, even when the magnetic heads are displaced in the direction parallel to the axis of rotation, flapping is not generated in the magnetic heads and the level of the reproduced signal is not attenuated. In addition, although only the magnetic head 2 mounted on the movable member 4 is shown in FIGS. 5a–5c, the magnetic head 3 mounted on the movable member 5 is moved similar to the above.

Next, an explanation will be given of the power consumption, when the deflectable rotary head assembly is driven, by use of the following equations.

When the mass of the movable member is represented by m[g] and the spring constant of the elastic support member by k[dyne/cm], the equation for the motion of the movable member is as follows:

$$F = K_f i_a = m \cdot a + k \cdot x = m\{a + (2\pi f_0)^2 x\} \quad (7),$$

where $K_f$[dyne/A]: thrust constant of the deflectable rotary head assembly, $\alpha$[cm/sec$^2$]: acceleration, x[cm]: amount of displacement, $i_a$[A]: driving current, and $f_o$[Hz]: natural oscillation frequency of $$f_o = \frac{1}{2\pi} \sqrt{\frac{k}{m}}$$

depending on the mass m of the movable member and the spring constant k of the elastic support member. Viscous resistance is omitted from the equation (7) for simplification. Also, the power $P_i$[W] necessary to drive head of the deflectable rotary head assembly is given in the following equation:

$$P_i = 2 \cdot (K_a \cdot v + R_a \cdot i_a) \cdot i_a \quad (8)$$

where $K_a$ [V/cm/sec] is the constant of electric generation for the deflectable rotary head assembly, $v$[cm/sec] is the moving speed of the movable member, and $R_a[\Omega]$ is the electric resistant of the driving coil. Eliminating $i_a$ from the equations (7) and (8), the power $P_i$ is given by the following equation (9):

$$P_i = \frac{2m \cdot K_a}{K_f} \{v \cdot \alpha + (2\pi f_o)^2 v \cdot x\} + 2m^2 \frac{R_a}{K_f^2} \{\alpha + (2\pi f_o)^2 x\}^2. \tag{9}$$

When the mean consumed power $P_i[W]$ is obtained from the equation (9) and rearranged by use of the relational expressions $$\alpha = \frac{dv}{dt} \text{ and } v = \frac{dx}{dt},$$

$\overline{P}_i$ is given by the following equation:

$$\overline{P}_i = \frac{1}{T} \int_0^T P_i \cdot dt \; (T: \text{Cycle period}) \tag{10}$$

$$= 2 \cdot m^2 \cdot \frac{R_a}{K_f^2} \cdot \frac{1}{T} \int_0^T \{\alpha + (2\pi f_o)^2 \cdot x\}^2 dt$$

$$\left( \because \int_0^T v \cdot \alpha dt = 0, \int_0^T v \cdot x dt = 0 \right).$$

In other words, the natural oscillation frequency $f_o$ of the movable member and the rotating trace $(x, \alpha)$ of the magnetic head are fixed, and the mean consumed power $\overline{P}_i$ is obtainable from the equation (10).

Figure 6:
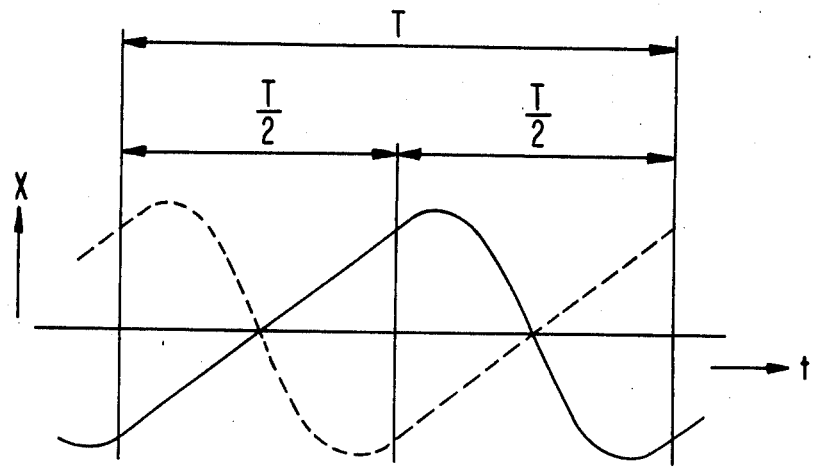
FIG. 6 is a waveform diagram showing a rotating trace of each magnetic head.

FIG. 6 is a graph showing the rotating trace of the magnetic heads during, for example, still reproduction, in which the ordinate represents the amount of displacement of the magnetic head in the direction parallel to the axis of rotation, and the abscissa the time. In FIG. 6, the rotating trace of one magnetic head (hereinafter called the A head) is shown by the solid line and that of the other magnetic head (hereinafter called the B head) by the dotted line. The cycle period T[sec] of the rotating trace, when the rotational speed of the rotary member carrying each magnetic head is represented by $f_m$[Hz], has a relation of $T = 1/f_m$ with the rotational speed, whereby the basic frequency component of the rotating trace of each magnetic head is $f_m$[Hz].

In the rotating trace of A head, the initial straight line (a time period of T/2) shows the A head tracking the recorded tracks on the magnetic tape. Next, in the latter half of the cycle period, while the B head is tracking the recorded tracks on the magnetic tape, the A head is restored to the next tracking start position.

Figure 7:
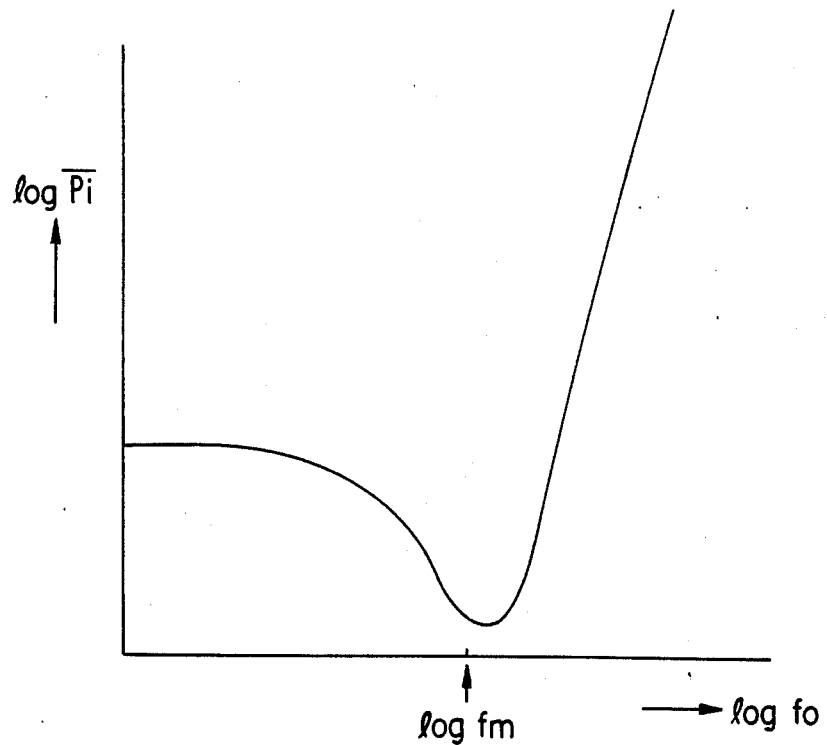
FIG. 7 is a graph of the characteristic showing an example of the relation between the mean power consumed by the deflectable rotary head assembly of the invention and the natural frequency of each movable member.

FIG. 7 is a graph plotting the mean consumed power $P_i$ when the deflectable rotary head assembly of the invention is driven to form the rotating trace shown in FIG. 6. In FIG. 7, the abscissa represents the natural oscillation frequency $f_o$ of each movable member supported by the elastic support member.

As seen from FIG. 7, when the natural oscillation frequency $f_o$ of each movable member is set in the vicinity of the rotational speed $f_m$ of the rotary member, the mean consumed power $P_i$ becomes a minimum.

The still reproduction mode has been described above, but even in other reproduction modes, the basic frequency component of the rotating trace of each magnetic head is $f_m$[Hz] the same as in the still reproduction mode, so that when the natural oscillation frequency $f_o$[Hz] of each movable member is set in the vicinity of the rotational speed $f_m$[Hz] of each rotary member, the mean consumed power $P_i$ similarly becomes minimum.

While an embodiment of the invention has been shown and described, the invention is not limited to the specific construction thereof, which is merely exemplary in the specification rather than defined.

What is claimed is:

1. A deflectable rotary head assembly comprising:
   a rotary member rotatable around an axis of rotation;
   first and second movable members each of which is mounted on said rotary member for displacement in opposite directions parallel to the axis of rotation of said rotary member;
   a magnetic head mounted on each of said first and second movable members;
   first and second magnets mounted on each of said first and second movable members and positioned relative to each other in a direction parallel to said axis of rotation, the first and second magnets on said first movable member being magnetized to have the like polarities aligned in a direction parallel to the axis of rotation and the first and second magnets on said second movable member being magnetized to have unlike polarities aligned in a direction parallel to the axis of rotation;
   a stationary member having a cylindrical surface with the cylindrical axis coinciding with the axis of rotation of said rotary member;
   first and second driving coils wound on said cylindrical surface of said stationary member and being spaced at predetermined distances from said first and second magnets on each of said first and second movable members and positioned for urging said first and second magnets, respectively, in directions parallel to said axis of rotation; and
   control circuit means for feeding first and second control currents to said first and second driving coils, respectively, for producing urging forces on said magnets for independently urging said first and second magnets on one of said movable members in either an up or down direction while urging the first and second magnets on the other of said movable members in opposite directions,
   whereby each of said first and second movable members can be displaced in a direction parallel to the axis of rotation of said rotary member in response to said first and second control currents for urging the magnetic head on one of said first and second movable members up or down while the other movable member remains fixed.

2. The assembly according to claim 1, further comprising resilient support means mounting each of said first and second movable members on said rotary member.

3. The assembly according to claim 2, wherein said support means comprises two annular-shaped resilient support members which are respectively fixed to the upper and lower ends of each of said first and second movable members.

4. The assembly according to claim 2, wherein the natural oscillation frequency of each of said first and second movable members is substantially the same as the rotational frequency of said rotary member.

5. The assembly according to claim 1, wherein the natural oscillation frequency of each of said first and second movable members is substantially the same as the rotational frequency of said rotary member.

6. The assembly according to claim 1, wherein said control circuit comprises means for receiving a first signal containing information for deflecting said magnetic head carried on said first movable member and a second signal containing information for deflecting said magnetic head carried on said second movable member; an adder for producing the sum of said first and second signals; a subtracter for producing a difference between said first and second signals; a first drive circuit connected to said adder and responsive to said sum for producing said first control current; and a second drive circuit connected to said subtracter and response to said difference for producing said second control current, whereby the magnetic head carried on each of said first and second movable members is deflected independently of the other magnetic head by the respective signals.

* * * * *